(12) United States Patent
Zhao et al.

(10) Patent No.: US 11,440,828 B2
(45) Date of Patent: Sep. 13, 2022

(54) METHOD OF TREATING SLUDGE

(71) Applicant: Veolia Water Solutions & Technologies Support, Saint-Maurice (FR)

(72) Inventors: Hong W. Zhao, Raleigh, NC (US); Sudhakar Viswanathan, Cary, NC (US); Luther G. Wood, Cary, NC (US); Brad Mrdjenovich, Fuquay Varina, NC (US); Richard W. DiMassimo, Raleigh, NC (US); James McQuarrie, Denver, CO (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 52 days.

(21) Appl. No.: 16/954,762

(22) PCT Filed: Dec. 18, 2018

(86) PCT No.: PCT/US2018/066153
§ 371 (c)(1),
(2) Date: Jun. 17, 2020

(87) PCT Pub. No.: WO2019/126117
PCT Pub. Date: Jun. 27, 2019

(65) Prior Publication Data
US 2021/0024396 A1    Jan. 28, 2021

Related U.S. Application Data

(60) Provisional application No. 62/599,866, filed on Dec. 18, 2017.

(51) Int. Cl.
*C02F 11/04* (2006.01)
*C05F 17/60* (2020.01)
(Continued)

(52) U.S. Cl.
CPC ............... *C02F 11/04* (2013.01); *C02F 9/00* (2013.01); *C05F 7/005* (2013.01); *C05F 17/40* (2020.01);
(Continued)

(58) Field of Classification Search
CPC ........ C02F 3/006; C02F 3/121; C02F 3/1215; C02F 3/308; C02F 11/04; C02F 11/13;
(Continued)

(56) References Cited

U.S. PATENT DOCUMENTS 7,402,245 B2   7/2008  Shimamura et al.
8,445,259 B2   5/2013  Kang
(Continued)

FOREIGN PATENT DOCUMENTS

JP    H10286592 A   10/1998
JP    H1110194 A    1/1999
(Continued)

OTHER PUBLICATIONS

"Exelys—Continusous thermal hydrolysis", https://cms.esi.info/Media/documents/134247_1474445374009.pdf [retrieved Feb. 11, 2019], XP055554457 (Jan. 1, 2016).
(Continued)

*Primary Examiner* — Claire A Norris
(74) *Attorney, Agent, or Firm* — Coats & Bennett, PLLC

(57) ABSTRACT

The present invention relates to a method of treating sludge containing phosphorus, ammonia and magnesium and enhancing the dewaterability of the sludge. The sludge is directed into a biological fermenter operated under anaerobic conditions. By controlling the temperature of the sludge in the fermenter or the hydraulic retention time of the sludge in the fermenter, phosphorus, ammonia and magnesium is released from the solids in the sludge into a liquid forming a part of the sludge. Sludge from the fermenter is subjected
(Continued)

to a solids-liquid separation process that produces a concentrated sludge and a liquid. The concentrated sludge or separated solids is directed to a thermal hydrolysis reactor that thermally hydrolyzes the concentrated sludge. After thermally hydrolyzing the concentrated sludge, the concentrated sludge is directed to an anaerobic digester that anaerobically digests the concentrated sludge.

16 Claims, 3 Drawing Sheets

(51) Int. Cl.
```
C05F 17/40      (2020.01)
C02F 9/00       (2006.01)
C02F 3/12       (2006.01)
C02F 11/12      (2019.01)
C02F 11/13      (2019.01)
C02F 11/18      (2006.01)
C05F 7/00       (2006.01)
C02F 1/52       (2006.01)
C02F 3/00       (2006.01)
C02F 101/10     (2006.01)
C02F 101/16     (2006.01)
```
(52) U.S. Cl.
CPC ............ *C05F 17/60* (2020.01); *C02F 1/5245* (2013.01); *C02F 3/006* (2013.01); *C02F 3/121* (2013.01); *C02F 3/1215* (2013.01); *C02F 11/12* (2013.01); *C02F 11/13* (2019.01); *C02F 11/18* (2013.01); *C02F 2101/105* (2013.01); *C02F 2101/16* (2013.01); *C02F 2209/02* (2013.01); *C02F 2209/06* (2013.01); *C02F 2209/14* (2013.01); *C02F 2209/18* (2013.01); *C02F 2301/08* (2013.01)

(58) Field of Classification Search
CPC .. C02F 11/18; C02F 11/12; C02F 9/00; C02F 2301/08; C02F 2101/105; C02F 2101/16; C02F 2101/10; C05F 17/60; C05F 17/40; C05F 17/50; C05F 7/005; Y02W 30/40; Y02W 10/10; Y02P 20/145
USPC ......................................... 210/609, 612, 613
See application file for complete search history.

(56) References Cited

U.S. PATENT DOCUMENTS

| | | | |
|---|---|---|---|
| 10,800,693 B2 | 10/2020 | Sievers | |
| 2009/0209025 A1* | 8/2009 | Goschl | .................. C02F 3/2873 |
| | | | 435/262.5 |
| 2011/0020862 A1* | 1/2011 | Audebert | ................ C12P 5/023 |
| | | | 435/41 |
| 2012/0094363 A1 | 4/2012 | Nawawi-Lansade et al. | |
| 2013/0134089 A1 | 5/2013 | Cote | |

FOREIGN PATENT DOCUMENTS

| | | | | |
|---|---|---|---|---|
| JP | 2002059190 A | | 2/2002 | |
| JP | 2004160343 A | | 6/2004 | |
| JP | 2010012467 A | | 1/2010 | |
| JP | 2011507673 A | | 3/2011 | |
| JP | 2012519578 A | | 8/2012 | |
| JP | 2017534442 A | | 11/2017 | |
| WO | 2006108532 A1 | | 10/2006 | |
| WO | WO-2015037989 A1 * | | 3/2015 | .............. C02F 3/286 |

OTHER PUBLICATIONS

Schnaars, Ken, "What every operator should know about anaerobic digestion", https://www.wef.org/globalassets/assets-wef/direct-download-library/public/operator-essentials/wet-operator-essentials—anaerobic-digestion—dec12.pdf [retrieved on Feb. 11, 2019], XP055554733, p. 82-83 (Dec. 1, 2012).

* cited by examiner

METHOD OF TREATING SLUDGE

RELATED APPLICATIONS

The present application is a U.S. National Stage Application of PCT Application No. PCT/US2018/066153, with an international filing date of Dec. 18, 2018. Applicant claims priority based on U.S. Patent Application No. 62/599,866 filed Dec. 18, 2017. The subject matter of these applications is incorporated herein in their entirety.

FIELD OF THE INVENTION

The present invention relates to methods of treating sludge, as well as methods for producing struvite.

BACKGROUND OF THE INVENTION

In wastewater treatment processes, various forms of sludge are treated by processes that include thermal hydrolysis, anaerobic digestion and dewatering. In many cases, the sludge, and particularly the solids or biomass therein, contains phosphorus, ammonia and magnesium. Sludge that has been subjected to an enhanced biological phosphorus removal process will contain biomass that includes substantial phosphorus through what is sometimes referred to as luxury phosphorus uptake. The presence of soluble phosphorus, ammonia and magnesium in the sludge makes dewatering the sludge difficult. When the sludge is subjected to anaerobic digestion, under reducing conditions, polyphosphate is released from the biomass as orthophosphate ($PO_4$). The presence of a high concentration of $PO_4$ and/or a shift in the monovalent:divalent cation ratio has a negative impact on the dewaterability of the sludge. For example, final dry solids content of the dewatered sludge, following anaerobic digestion, can decrease by as much as 3-5% while simultaneously requiring an increase in polymer dose of up to 20-30%.

Also, the presence of phosphorus, ammonia and magnesium in the sludge during anaerobic digestion increases the potential for struvite formation in the anaerobic digesters, as well as pipes and conduits that convey the sludge. Magnesium is often the limiting constituent. The sludge that has been subjected to an enhanced biological phosphorus removal process will contain biomass that includes substantial magnesium. Struvite is a mineral formed through precipitation of magnesium, ammonia and phosphate (MAP) which can precipitate as scale when orthophosphate, ammonia and magnesium are present and where the pH increases to a point where struvite approaches its minimum solubility point.

There is an additional concern with respect to the potential for ammonia toxicity in the anaerobic digester. In the course of thermal hydrolysis, high ammonia concentrations can be released and these high ammonia concentrations can reach inhibiting levels in the anaerobic digester.

Therefore, in the case of a sludge treatment process that includes thermal hydrolysis followed by anaerobic digestion, there is a benefit in pre-treating and pre-conditioning the sludge to cause the phosphorus, ammonia and magnesium to be released from the biomass prior to the sludge being subjected to thermal hydrolysis and anaerobic digestion.

SUMMARY OF THE INVENTION

The present invention relates to a process for pre-treating (pre-conditioning) sludge which aims to improve the dewaterability of the sludge. Sludge is directed to a biological fermenter and by controlling the temperature of the sludge and/or the hydraulic retention time of the sludge in the fermenter, phosphorus and ammonia is released from the biomass in the sludge. Thereafter, the sludge is directed to a solids-liquid separation or pre-dewatering device which yields a concentrated sludge and a liquid stream rich in phosphorus, ammonia and magnesium. The dry solids concentration of the concentrated sludge produced by the pre-dewatering device is substantially greater than the dry solids content of the sludge prior to fermentation. After the sludge has been pre-dewatered, the concentrated sludge is directed to a thermal hydrolysis reactor and undergoes thermal hydrolysis. Thereafter, the thermally hydrolyzed sludge is directed to an anaerobic digester and subjected to anaerobic digestion.

In some cases, the phosphorus, ammonia and magnesium-rich liquid produced by the pre-dewatering device can be used to produce struvite. In one embodiment, the liquid is mixed with anaerobically digested sludge and the resulting mixture is directed to a struvite formation process downstream of the anaerobic digester. Here phosphorus, ammonia and magnesium from the mixture is recovered and utilized to form struvite. In another embodiment, the phosphorus, ammonia and magnesium-rich stream from the pre-dewatering device is directed to a separate struvite reactor where the phosphorus, ammonia and magnesium are utilized to produce struvite.

Other objects and advantages of the present invention will become apparent and obvious from a study of the following description and the accompanying drawings which are merely illustrative of such invention.

DESCRIPTION OF EXEMPLARY EMBODIMENT

Figure 1:
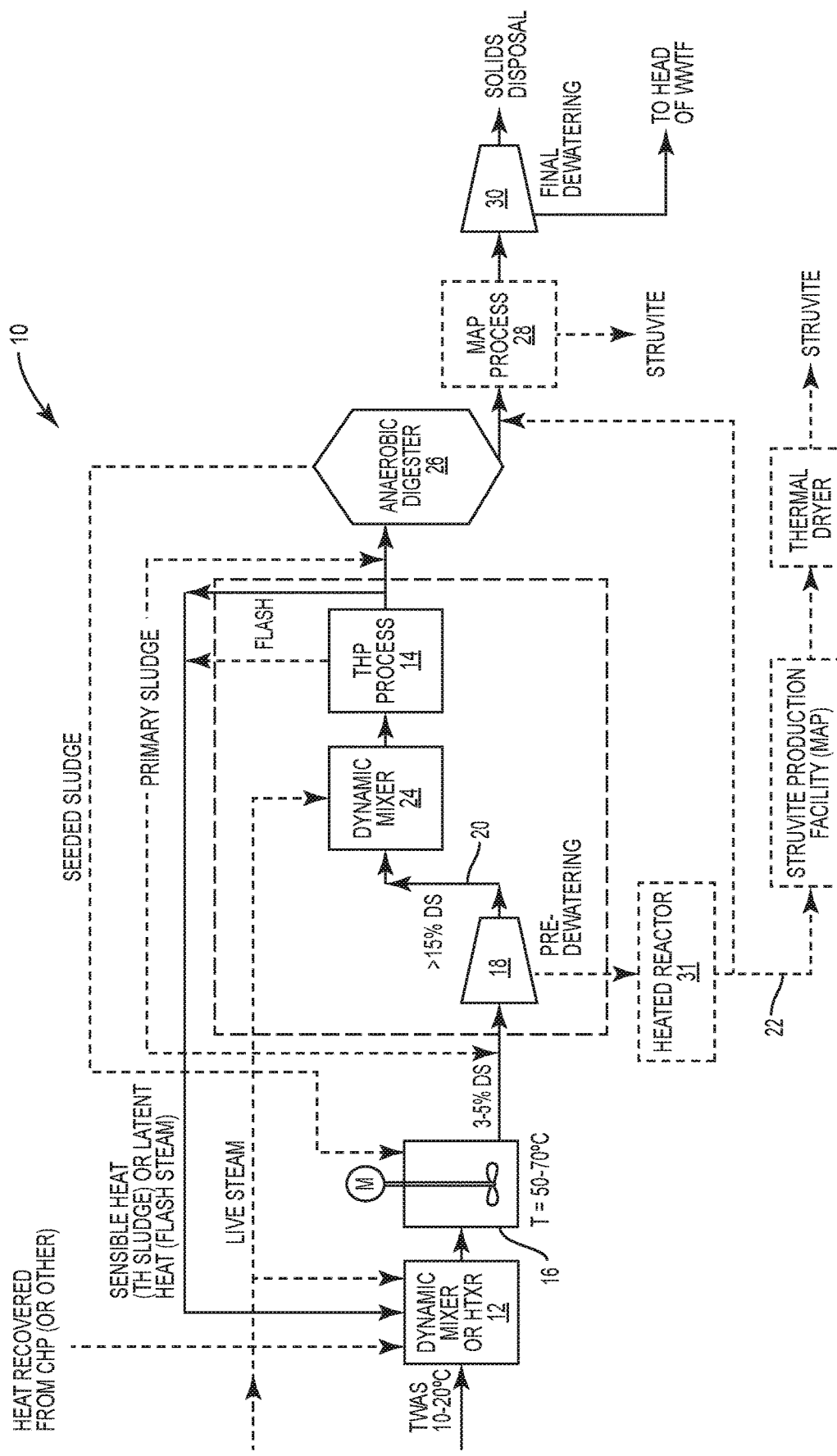
FIG. 1 is a schematic illustration of a sludge treatment process that includes the option of recovering phosphorus, ammonia and magnesium and producing struvite therefrom.

With further reference to FIG. 1, there is shown therein a process for treating sludge which is indicated generally by the numeral 10. The process entails pre-treating the sludge and subjecting the sludge to a thermal hydrolysis process and thereafter anaerobically digesting the sludge. After the sludge has been anaerobically digested, the sludge can be directed to a dewatering system where the sludge is dewatered. As a part of the pre-treatment process, phosphorus, ammonia and magnesium are released from the biomass prior to the pre-dewatering step. As discussed in more detail below, the release of phosphorus, ammonia and magnesium from the biomass in the sludge and the removal of the released phosphorus, ammonia and magnesium from the sludge has the potential to enhance downstream dewatering of the sludge. Further, the released phosphorus, ammonia and magnesium may be recovered and used to produce struvite. As discussed below, the released phosphorus, ammonia and magnesium can be directed to a struvite production process or in the alternative, the released phosphorus, ammonia and magnesium can be re-introduced into the effluent from the anaerobic digester and used in a struvite production process that is located downstream of the anaerobic digester.

With particular reference to FIG. 1, sludge is directed to a dynamic mixer or heat exchanger 12. The sludge, in one embodiment, is thickened waste-activated sludge (TWAS). In some cases, seeded sludge from a downstream anaerobic digester 26 can be mixed with the TWAS. The sludge contains a solid phase including a biomass and a liquid phase. Typically phosphorus, ammonia and magnesium are contained within the biomass that forms a part of the sludge. Furthermore, in a typical sludge treatment process, the temperature of the sludge entering the dynamic mixer or heat exchanger 12 is in the range of 10-20° C.

In the dynamic mixer or heat exchanger 12, steam or thermally hydrolyzed sludge can be used to heat the incoming sludge. Typically the sludge in the dynamic mixer or heat exchanger 12 is heated to a temperature of approximately 50-70° C. As indicated in FIG. 1, there are a number of options for heating the sludge in the dynamic mixer or heat exchanger. In cases where a dynamic mixture is employed, live steam, flash steam or thermally hydrolyzed sludge can be mixed with the incoming sludge to heat the incoming sludge. Note that the flash steam and thermally hydrolyzed sludge is produced by the downstream thermal hydrolysis reactor 14. In cases where a heat exchanger is utilized, thermally hydrolyzed sludge can be directed through one side of the heat exchanger while the incoming sludge is directed through the other side and sensible heat is utilized to heat the incoming sludge. Also, as indicated in FIG. 1, heat recovered from combined heat and power (CHP) can also be utilized to heat the incoming sludge.

Sludge from the dynamic mixer or heat exchanger 12 is pumped to a biological fermenter 16 which is operated under anaerobic conditions. Fermenter 16 can be operated as a batch or a continuous flow complete mixed reactor. Fermenter 16 is employed to pre-treat the sludge in a way that improves or enhances its dewaterability. To achieve this, certain conditions in the fermenter 16 are maintained so as to trigger the release of phosphorus, ammonia and magnesium from the biomass of the sludge. In order to maintain conditions in the fermenter 16 that give rise to the release of phosphorus, ammonia and magnesium from the biomass, control revolves around controlling the temperature of the sludge in the fermenter and/or the hydraulic retention time of the sludge in the fermenter. Relatively long hydraulic retention times (HRT) with high temperature facilitates the fermentation process by decreasing pH and causing the release of ammonia, phosphorus and magnesium. In one embodiment, the temperature of the sludge is controlled to a temperature range of 50-70° C. and/or the hydraulic retention time of the sludge in the fermenter is maintained at approximately 6 to approximately 10 hours.

In one embodiment, the concentration of phosphorus and ammonia released from the biomass is continuously monitored, and the temperature of the sludge in the fermenter 16 and/or HRT is dynamically controlled to produce a pre-selected mole ratio of ammonia to phosphate. In one embodiment, the control is based on maintaining a mole ratio of ammonia to phosphate of 1.0 to 1.5. Temperature of the sludge in the fermenter 16 can be controlled by the amount of heat supplied to the incoming sludge in the dynamic mixer or heat exchanger 12. As discussed above, in a typical process, the dry solids content of the sludge in the fermenter 16 is approximately 3-5% by wt. After the pre-dewatering process, the concentrated sludge 20 will typically have a dry solids content greater than 15% by wt.

The pH of the sludge in the fermenter is continuously monitored. It is desirable to control the pH of the sludge to approximately 4-5. This acidic condition in the sludge facilitates the release of phosphorus, ammonia and magnesium from the biomass in the sludge.

Therefore, it is appreciated that the function of the fermented 16 is to create and maintain conditions in the fermenter and in the sludge that results in phosphorus, ammonia and magnesium migrating from the biomass into the liquid phase of the sludge.

From the fermenter 16, the pre-treated sludge is directed to a solids-liquid separation or pre-dewatering device 18. Typically the sludge directed into the pre-dewatering device 18 will have a dry solids content by weight of approximately 3-5%. Pre-dewatering device 18 produces a concentrated sludge stream that is indicated by the numeral 20 and a liquid stream 22. See FIG. 1. It is appreciate that the concentrated sludge stream 20 will include a concentrated solid phase and, in one embodiment, will have a dry solids content greater than 15% by wt. Liquid phase 22 separated by the pre-dewatering device 18, of course, includes the phosphorus, ammonia and magnesium released by the biomass in the fermenter 16.

Concentrated sludge stream 20 is directed from the pre-dewatering device 18 to a dynamic mixer 24. Here again the concentrated sludge is heated. In this case, live steam can be directed into the dynamic mixer 24 and mixed with the concentrated sludge stream to heat the concentrated sludge. Typically the sludge is heated in the dynamic mixer 24 to a temperature of approximately 165° C.

Concentrated sludge from the dynamic mixer 24 is directed to the thermal hydrolysis reactor 14 which subjects the concentrated sludge to a thermal hydrolysis process. Details of a thermal hydrolysis process are not dealt with here in detail because such is not per se material to the present invention. For a complete and unified understanding of a typical thermal hydrolysis process, one is referred to the disclosure in U.S. Pat. No. 9,527,760, which is expressly incorporated herein by reference.

From the thermal hydrolysis reactor 14, thermally hydrolyzed sludge is directed to an anaerobic digester 26. In the anaerobic digester, the sludge is subjected to an anaerobic digestion process. Again, the actual anaerobic digestion process is not per se material to the present invention and further anaerobic digestion is a conventional process used in treating sludge. For a complete and unified understanding of anaerobic digestion, one is referred to U.S. Pat. No. 9,758,416, the disclosure of which is expressly incorporated herein by reference. As noted above, in some cases seeded sludge may be mixed with the TWAS in the fermenter 16 or at a point upstream of the fermenter. A source of seeded sludge can be the digested sludge produced by the anaerobic digester 26. As an option illustrated in FIG. 1, anaerobically digested sludge can be directed from the anaerobic digester 26 to the fermenter 16 or to a point upstream of the fermenter. By employing seeded sludge from a thermophilic anaerobic digester, this can increase the amount of ammonia released from the solids and also may increase the rate of release.

The effluent from the anaerobic digester 26 can be directed to a process for producing struvite. Struvite (magnesium, ammonium phosphate) is a phosphate mineral with formula: $NH_4MgPO_4 \cdot 6H_2O$. In FIG. 1, this is referred to as a "MAP process". In any event, phosphorus, ammonia and magnesium can be recovered from the effluent of the anaerobic digester 26 and converted to struvite by conventional means. Again, the details of MAP process are not per se material to the present invention as such processes are known.

The MAP process produces an effluent and it is directed to a final dewatering device indicated by the number 30. Final dewatering device 30 produces solids for disposal, as well as a liquid portion or phase that is typically directed to the head of a wastewater treatment facility (WWTF).

There are a number of options for processing the liquid stream 22 (produced by the pre-dewatering device 18) rich in phosphorus, magnesium and ammonia. First, the liquid stream 22 can be mixed with the anaerobically digested sludge upstream of the MAP process 28. This increases the concentration of phosphorus, ammonia and magnesium in the anaerobically digested sludge. Through a struvite crystallization or formation process, the phosphorus, ammonia and magnesium are recovered from the sludge and used to produce struvite. A second option is to direct the liquid stream 22 to a separate struvite production facility where the phosphorus, ammonia and magnesium in the liquid stream are used to form struvite.

Note in FIG. 1 that line 22 includes a heated reactor 31 possibly including a heating element, such as a heat exchanger. Heated reactor 31 can be used to heat and pasteurize the liquid from the pre-dewatering device 18 in either of the two cases shown in FIG. 1. That is, the heated reactor 31 can be used to heat the liquid directed to the influent to the MAP process 28 or to a struvite production facility (MAP). This heated reactor 31 is specially designed to provide a retention time to meet Class A requirement via time-temperature requirements thus protecting pathogen reduction criteria of the solids disposal stream produced by the final dewatering device 30. The heating elements in heated reactor 31 are specially designed to address and minimize precipitation and fouling associated with high heat exchange conditions in this liquid mixture. Also, it is appreciated that the heating element in heated reactor 31 that is employed to heat the liquid phase produced by the pre-dewatering device 18 can be heated with live steam or heat recovered from the main stream process.

There are a number of advantages to the sludge treatment process described above and shown in FIG. 1. It is hypothesized that by releasing the phosphorus, ammonia and magnesium from the biomass in the sludge prior to thermal hydrolysis and anaerobic digestion this will improve the dewaterability of the sludge by providing a sludge with a higher dry solids concentration. It is also likely to: (a) reduce struvite formation potential in the anaerobic digester and significantly reduce the phosphorus related mass that ends up in a landfill. Furthermore, this may also reduce reactor size requirement and may offer other benefits such as decreasing the size requirement for the sludge cake handling and storage systems that are located upstream of the thermal hydrolysis reactor 14. In addition, since some ammonia is released prior to thermal hydrolysis, the potential for ammonia toxicity in the anaerobic digester 26 is minimized.

Further the process described above and shown in FIG. 1 may reduce the tendency of struvite scaling in the anaerobic digester and other associated equipment and pipes. That is, the process shown in FIG. 1 tends to decrease struvite formation in the anaerobic digester and associated equipment. As noted above, struvite is a mineral formed by the precipitation of magnesium, ammonium and phosphate, which can precipitate as scale when phosphate, ammonia and magnesium is preset and the pH increases to a point where struvite approaches its minimum solubility point. In addition, it is hypothesized that the process of the present invention will improve dewatering performance, especially when coupled with the post-digestion MAP process. Furthermore, the process of the present invention helps to redirect a substantial amount of the phosphorus out of the biosolids exiting the process when the liquid stream produced during pre-dewatering is coupled with a MAP process.

Figure 3:
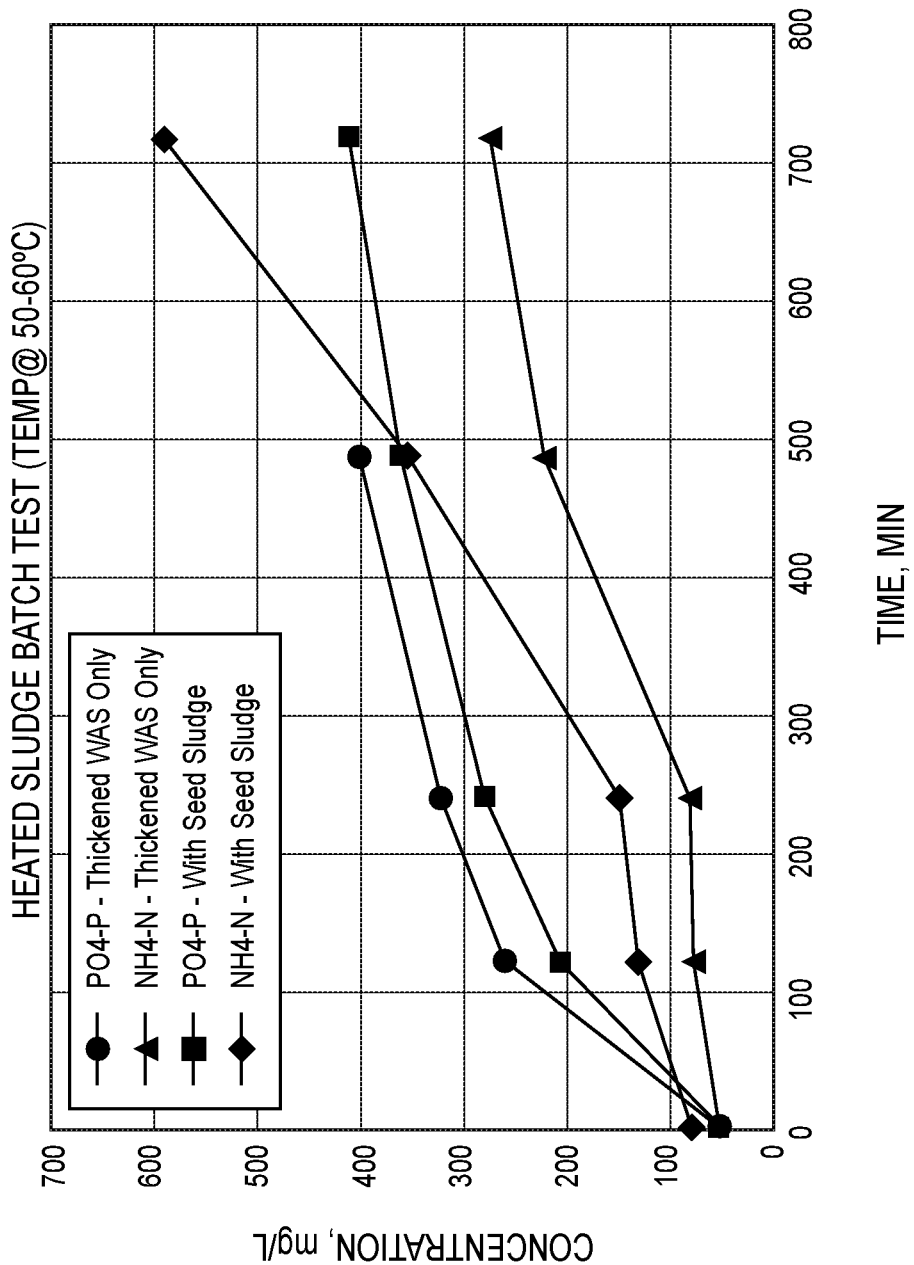
FIG. 3 is a graph showing the concentration of phosphorus (PO4-P) and ammonia (NH4-N) released from the solids over a period of time where the sludge is waste-activated sludge (WAS) and in one case seeded sludge was also added.

A series of batch tests (4 rounds) were conducted to examine the impact of temperature and hydraulic retention time on phosphorus and ammonia release from waste activated sludge and seeded sludge. The results of these tests are shown in the graph of FIG. 3.

The sludge was placed in a one liter beakers. The beakers were heated at a controlled temperature. Sludge in the beakers were mixed with mixing blades on a jar testing device at 100 revolutions per minute. The beakers were insulated around the side and covered on the top but not sealed.

Once the sludge was poured into the beakers, mixed and heater, grabbed samples were taken. Grabbed samples were taken at 0, 60, 120, 240, and 1440 minutes. The samples were centrifuged and the supernatant was analyzed for phosphorus and ammonia. Also, pH and temperature in each beaker was recorded at approximately every 60 minutes.

Sludge used in the test was taken from a local wastewater treatment plant. The first two rounds of testing were designed to evaluate temperature effect. Both waste activated sludge and thickened waste activated sludge were tested at four different temperature ranges: ambient temperature, 30-40° C., 50-60° C. and 70-90° C. Based on the first two rounds of testing, it was concluded that a temperature in the range of 50-70° C. has a positive impact on the release of phosphorus and ammonia. Based on this, it was determined that the next two rounds would be tested at a temperature of 50-60° C. The last two rounds of testing were designed to examine phosphorus and ammonia release with and without seeded sludge from a thermophilic anaerobic digester.

From the four rounds of testing, it was concluded:
1. That temperatures greater than 70° C. tended to delay ammonia release. The preferable temperature range for phosphorus and ammonia release was determined to be approximately 50-70° C. and it appeared that a temperature range of 50-60° C. might be an optimal temperature range. This indicates that the ammonia release is a result of thermophilic biological fermentation.
2. Significant ammonia release was observed between 4-10 hours while phosphorus release was observed between 2-8 hours. See FIG. 3. Preferably the hydraulic retention time of the sludge in the biological fermenter 16 is approximately 6-10 hours.
3. Seeding the batch reactor with sludge from a thermophilic anaerobic digester not only increased the amount of ammonia released but also increased the rate of release. This confirms that ammonia release is a biological reaction.
4. The extent of ammonia and phosphorus release depends on the concentration of the sludge. Higher sludge concentrations would result in more ammonia and phosphorus being released. It should be noted that phosphorus release was close to its maximum at 8 hours, and the ammonia release at the same time was enough to recover all of the phosphorus release through struvite formation.

Figure 2:
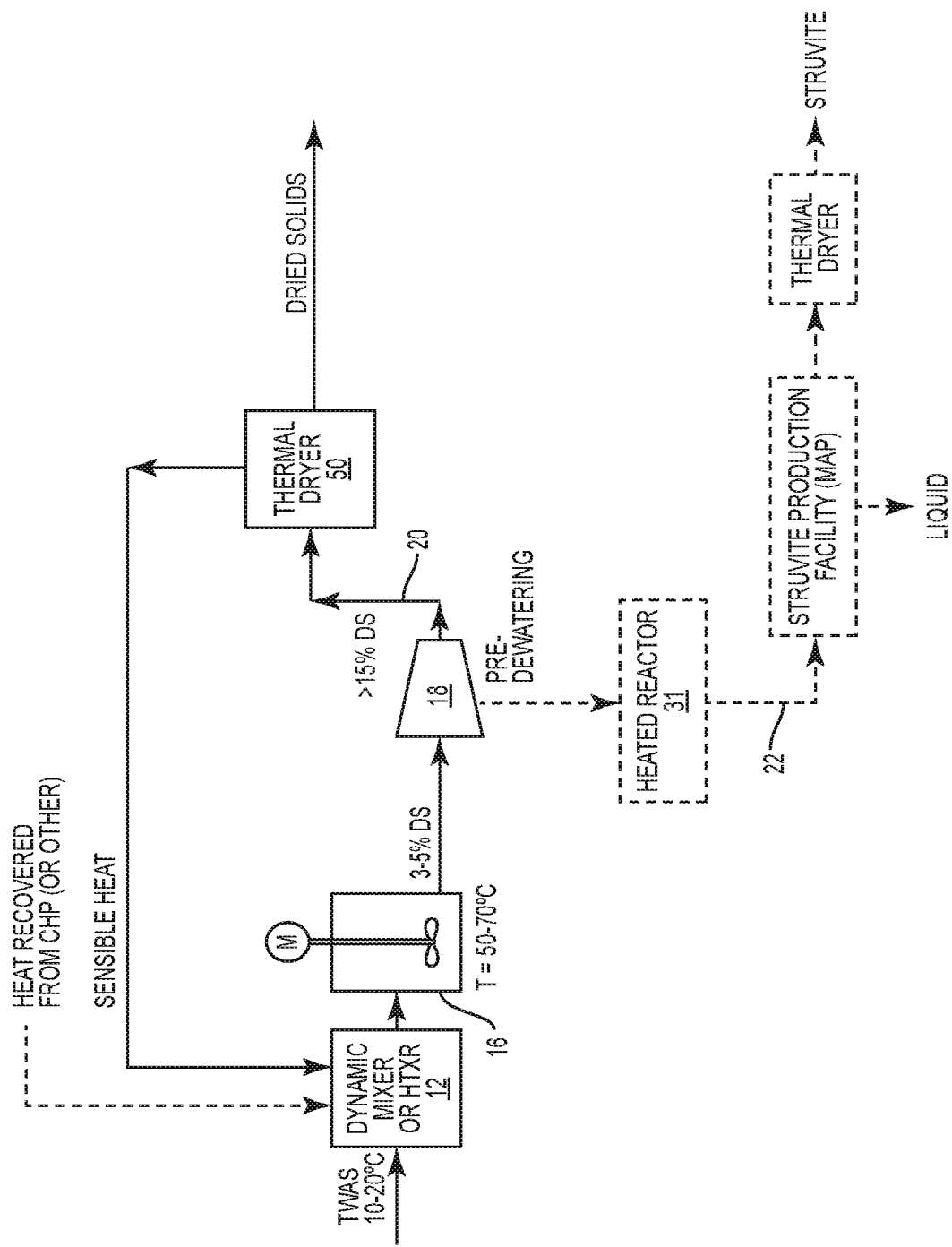
FIG. 2 is a schematic illustration of an alternate embodiment of the present invention employing a thermal dryer for drying solids after their separation from sludge.

FIG. 2 illustrates an alternative process for treating sludge. It is similar to the process described above and shown in FIG. 1 with the exception that a thermal sludge dryer 50 replaces the dynamic mixer 24 and all of the systems and processes downstream of the dynamic mixer 24. In one embodiment, the thermal solids dryer 50 is operated at approximately 160° C. Typically, the solids from the pre-dewatering device 18 are loaded onto a conveyor that moves through the dryer. Typically the solids, after drying, will have a drying solids content of approximately 90-95 wt. %.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of treating sludge including solids containing phosphorus, ammonia and magnesium and enhancing the dewaterability of the sludge, comprising:
   directing the sludge to a biological fermenter;
   biologically treating the sludge in the biological fermenter which is operated under anaerobic conditions;
   causing the solids to release phosphorus, ammonia and magnesium into a liquid forming a part of the sludge by maintaining: (1) the temperature of the sludge in the fermenter to a temperature within the range of 50° C.-70° C.; and (2) controlling the hydraulic retention time of the sludge in the fermenter to approximately 6 to approximately 10 hours;
   directing the sludge from the fermenter to a solids-liquid separator;
   separating the solids from the liquid containing the released phosphorus, ammonia and magnesium;
   directing the separated solids to a thermal hydrolysis reactor and thermally hydrolyzing the separated solids; and
   after thermally hydrolyzing the separated solids, directing the hydrolyzed separated solids to an anaerobic digester and anaerobically digesting the hydrolyzed separated solids.

2. The method of claim 1 wherein the method includes mixing the liquid containing the released phosphorus, ammonia and magnesium with the anaerobically digested solids to form a mixture and directing the mixture to a MAP process located downstream of the anaerobic digester and forming struvite in the MAP process.

3. The method of claim 1 wherein the method includes directing the liquid containing the released phosphorus, ammonia and magnesium to a struvite reactor and producing struvite.

4. The method of claim 1 including heating and pasteurizing the liquid containing the released phosphorus, ammonia and magnesium; and after heating the liquid, directing the pasteurized liquid to: (1) a MAP process located downstream of the anaerobic digester and producing struvite or (2) directly to a struvite production process.

5. The method of claim 4 including directing the pasteurized liquid directly to a struvite production process and producing struvite, and thereafter thermally drying the struvite.

6. The method of claim 1 including heating the sludge prior to the sludge reaching the biological fermenter in a dynamic mixer or heat exchanger located upstream of the biological fermenter.

7. The method of claim 1 including facilitating the release of phosphorus, ammonia and magnesium from the solids into the liquid by controlling the pH of the sludge in the biological fermenter to approximately 4-5.

8. The method of claim 1 including dewatering the anaerobically digested sludge produced by the anaerobic digester.

9. The method of claim 1 including monitoring the concentration of the phosphorus and ammonia released from the solids and controlling the temperature of the sludge in the biological fermenter and/or controlling the HRT of the sludge in the fermenter so as to maintain a mole ratio of the ammonia to the phosphorus of approximately 1.0-1.5.

10. The method of claim 1 including seeding the sludge with anaerobically digested sludge from the anaerobic digester by transferring sludge from the anaerobic digester to the biological fermenter or to a point upstream of the biological fermenter.

11. The method of claim 1 including heating the sludge prior to directing the sludge to the biological fermenter.

12. The method of claim 11 wherein anaerobically digesting the hydrolyzed separated solids produces anaerobically digested sludge; and wherein the method includes recycling a portion of the anaerobically digested sludge and mixing the portion of anaerobically digested sludge with the liquid containing the phosphorus, ammonia and magnesium to form a mixture.

13. The method of claim 12 including directing the mixture to a MAP process located downstream of the anaerobic digester and forming struvite in the MAP process.

14. A method of treating sludge including solids containing phosphorus, ammonia and magnesium and enhancing the dewaterability of the sludge, comprising:
   directing the sludge to a biological fermenter;
   biologically treating the sludge in the biological fermenter which is operated under anaerobic conditions;
   causing the solids to release phosphorus, ammonia, and magnesium into a liquid forming a part of the sludge by maintaining: (1) the temperature of the sludge in the fermenter to a temperature within the range of 50° C. -70° C.; and (2) controlling the hydraulic retention time of the sludge in the fermenter to approximately 6 to approximately 10 hours;
   directing the sludge from the fermenter to a solids-liquid separator;
   separating the solids from the liquid containing the released phosphorus, ammonia and magnesium; and
   directing the separated solids to a thermal dryer and drying the solids.

15. The method of claim 14 including:
pasteurizing the liquid containing the phosphorus, ammonia and magnesium; and
after pasteurizing the liquid containing the phosphorus, ammonia and magnesium,
   directing the liquid to a struvite production facility and producing struvite.

16. The method of claim 14 further including:
pasteurizing the liquid containing the phosphorus, ammonia and magnesium; and
directing the liquid containing the phosphorus, ammonia and magnesium to a struvite production facility and producing struvite and thereafter thermally drying the produced struvite.

* * * * *